(12) United States Patent
Sobanski et al.

(10) Patent No.: US 11,591,920 B2
(45) Date of Patent: Feb. 28, 2023

(54) VANE ARC SEGMENT WITH CURVED RADIAL FLANGE

(71) Applicant: RAYTHEON TECHNOLOGIES CORPORATION, Farmington, CT (US)

(72) Inventors: Jon E. Sobanski, Glastonbury, CT (US); Kathryn S. Read, Marlborough, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/504,627

(22) Filed: Oct. 19, 2021

(65) Prior Publication Data

US 2022/0154587 A1 May 19, 2022

Related U.S. Application Data

(60) Provisional application No. 63/113,276, filed on Nov. 13, 2020.

(51) Int. Cl.
*F01D 9/04* (2006.01)
*F02C 3/04* (2006.01)

(52) U.S. Cl.
CPC ............... *F01D 9/041* (2013.01); *F02C 3/04* (2013.01); *F05D 2220/32* (2013.01); *F05D 2240/30* (2013.01); *F05D 2300/6033* (2013.01)

(58) Field of Classification Search
CPC .......... F02C 3/04; F01D 25/246; F01D 5/282; F01D 5/284; F01D 9/041; F05D 2220/32;
(Continued)

(56) References Cited

U.S. PATENT DOCUMENTS

| 7,104,756 B2 * | 9/2006 | Harding ................. F01D 5/189 416/233 |
| 7,922,444 B2 * | 4/2011 | Propheter-Hinckley ..................... F01D 11/005 415/110 |

(Continued)

FOREIGN PATENT DOCUMENTS

| EP | 3000979 | 3/2016 |
| EP | 3121379 | 1/2017 |
| EP | 3800327 | 4/2021 |

OTHER PUBLICATIONS

European Search Report for European Patent Application No. 21207463.7 dated May 23, 2022.

*Primary Examiner* — Jesse S Bogue
(74) *Attorney, Agent, or Firm* — Carlson, Gaskey & Olds, P.C.

(57) ABSTRACT

A vane arc segment includes an airfoil piece that defines first and second platforms and a airfoil section that extends between the first and second platforms. The airfoil section has a trailing edge, a leading edge, a pressure side, and a suction side. The platforms each define first and second circumferential mate faces, forward and aft sides, a gaspath side, a non-gaspath side, and a radial flange that projects from the non-gaspath side. Each radial flange extends continuously and includes a first leg portion that extends adjacent the trailing edge, a second leg portion that extends from the first leg portion and curves around the suction side, and a third leg portion that extends from the second leg portion toward the forward side.

20 Claims, 4 Drawing Sheets

(58) Field of Classification Search
CPC ............. F05D 2240/30; F05D 2260/15; F05D 2300/6033; F05D 2300/6034
See application file for complete search history.

(56) References Cited

U.S. PATENT DOCUMENTS

| | | | |
|---|---|---|---|
| 8,834,109 B2* | 9/2014 | Propheter-Hinckley | F01D 9/042 415/191 |
| 10,072,516 B2* | 9/2018 | Carr | F01D 9/041 |
| 10,975,706 B2* | 4/2021 | Farrar | C04B 35/565 |
| 11,073,039 B1* | 7/2021 | Whittle | F01D 9/042 |
| 11,149,560 B2* | 10/2021 | Whittle | F01D 5/282 |
| 11,162,368 B2* | 11/2021 | Generale | F01D 9/065 |
| 11,346,228 B1* | 5/2022 | Burdette | D03D 1/00 |
| 2013/0004296 A1* | 1/2013 | Propheter-Hinckley | F01D 5/284 415/115 |
| 2013/0343873 A1* | 12/2013 | Spangler | F01D 17/162 415/115 |
| 2016/0084096 A1* | 3/2016 | Carr | F02C 3/04 415/208.1 |
| 2018/0119549 A1* | 5/2018 | Vetters | F01D 5/147 |
| 2020/0109858 A1* | 4/2020 | Whittle | F23R 3/16 |
| 2020/0232332 A1 | 7/2020 | Farrar et al. | |
| 2021/0246808 A1* | 8/2021 | Sobanski | F01D 9/04 |
| 2022/0154587 A1* | 5/2022 | Sobanski | F01D 5/284 |
| 2022/0228509 A1* | 7/2022 | Sobanski | F02C 3/04 |
| 2022/0316350 A1* | 10/2022 | Sobanski | F01D 5/147 |

* cited by examiner

VANE ARC SEGMENT WITH CURVED RADIAL FLANGE

CROSS-REFERENCE TO RELATED APPLICATION

The present disclosure claims priority to U.S. Provisional Application No. 63/113,276 filed Nov. 13, 2020.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment according to an example of the present disclosure includes an airfoil piece that defines first and second platforms and an airfoil section that extends between the first and second platforms. The airfoil section has a trailing edge, a leading edge, a pressure side, and a suction side. The first and second platforms each define first and second circumferential mate faces, forward and aft sides, a gaspath side, a non-gaspath side, and a radial flange projecting from the non-gaspath side. Each radial flange extends continuously and includes a first leg portion that extends adjacent the trailing edge, a second leg portion that extends from the first leg portion and curves around the suction side, and a third leg portion that extends from the second leg portion toward the forward side.

In a further embodiment of any of the foregoing embodiments, the airfoil piece is hollow and is formed of a ceramic matrix composite.

In a further embodiment of any of the foregoing embodiments, the ceramic matrix composite has a plurality of fiber plies that are continuous from the radial flange of the first platform, through the airfoil section, and through the radial flange of the second platform.

In a further embodiment of any of the foregoing embodiments, the first leg portion is parallel to the aft side.

In a further embodiment of any of the foregoing embodiments, the third leg portion is parallel to the second circumferential mate face.

In a further embodiment of any of the foregoing embodiments, the first leg portion defines an aft-facing load face.

In a further embodiment of any of the foregoing embodiments, the third leg portion defines a circumferentially-facing load face.

In a further embodiment of any of the foregoing embodiments, the radial flange of the first platform is a single, exclusive radial flange of the first platform, and the radial flange of the second platform is a single, exclusive radial flange of the second platform.

In a further embodiment of any of the foregoing embodiments, the radial flange curves at least 80 degrees.

In a further embodiment of any of the foregoing embodiments, the first leg portion of the first platform is closer to the trailing edge than to the aft side of the first platform.

In a further embodiment of any of the foregoing embodiments, the airfoil piece includes fiber plies that form a consolidated section in the radial flange and a bifurcated section in which the plies from the radial flange split and turn away from each other.

In a further embodiment of any of the foregoing embodiments, each of the first and second platforms includes a three-dimensional woven body encased in fiber plies that form the flanges.

A gas turbine engine according to an example of the present disclosure includes a compressor section, a combustor in fluid communication with the compressor section, and a turbine section in fluid communication with the combustor. The turbine section has vanes disposed about a central axis of the gas turbine engine. Each of the vanes is in accordance with any of the foregoing embodiments.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
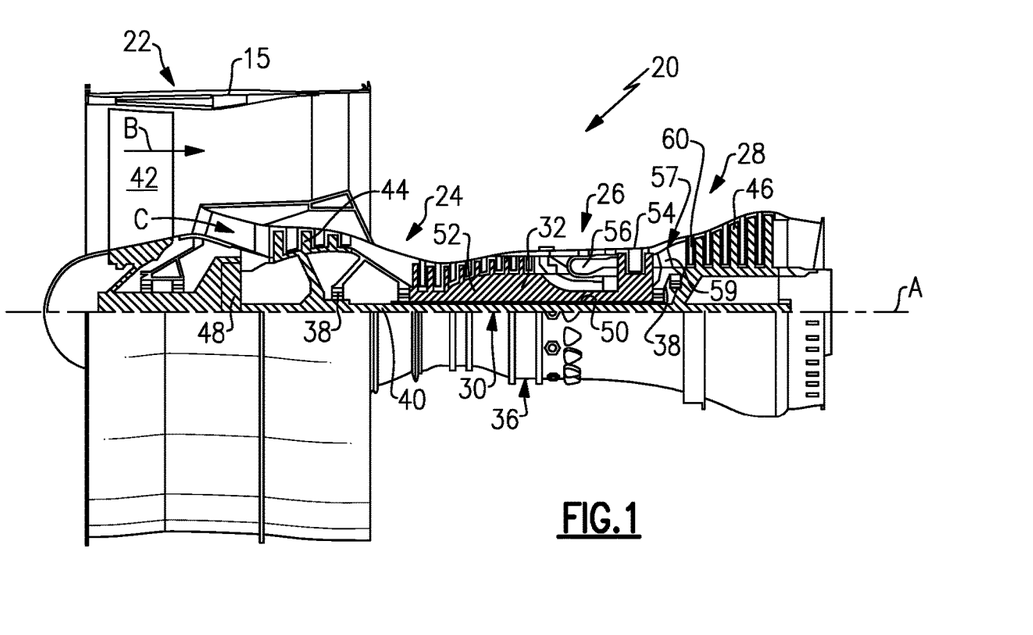
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
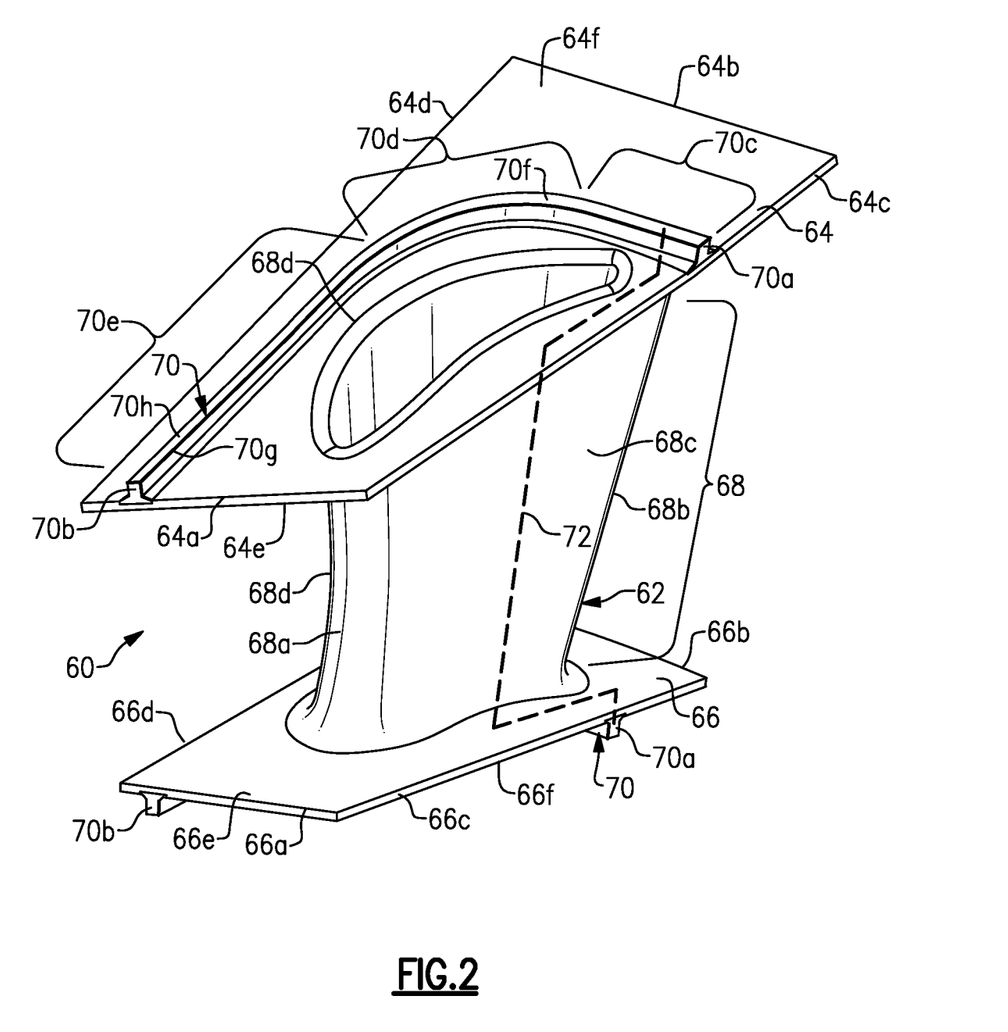
FIG. 2 illustrates a view of an example vane arc segment.
Figure 3:
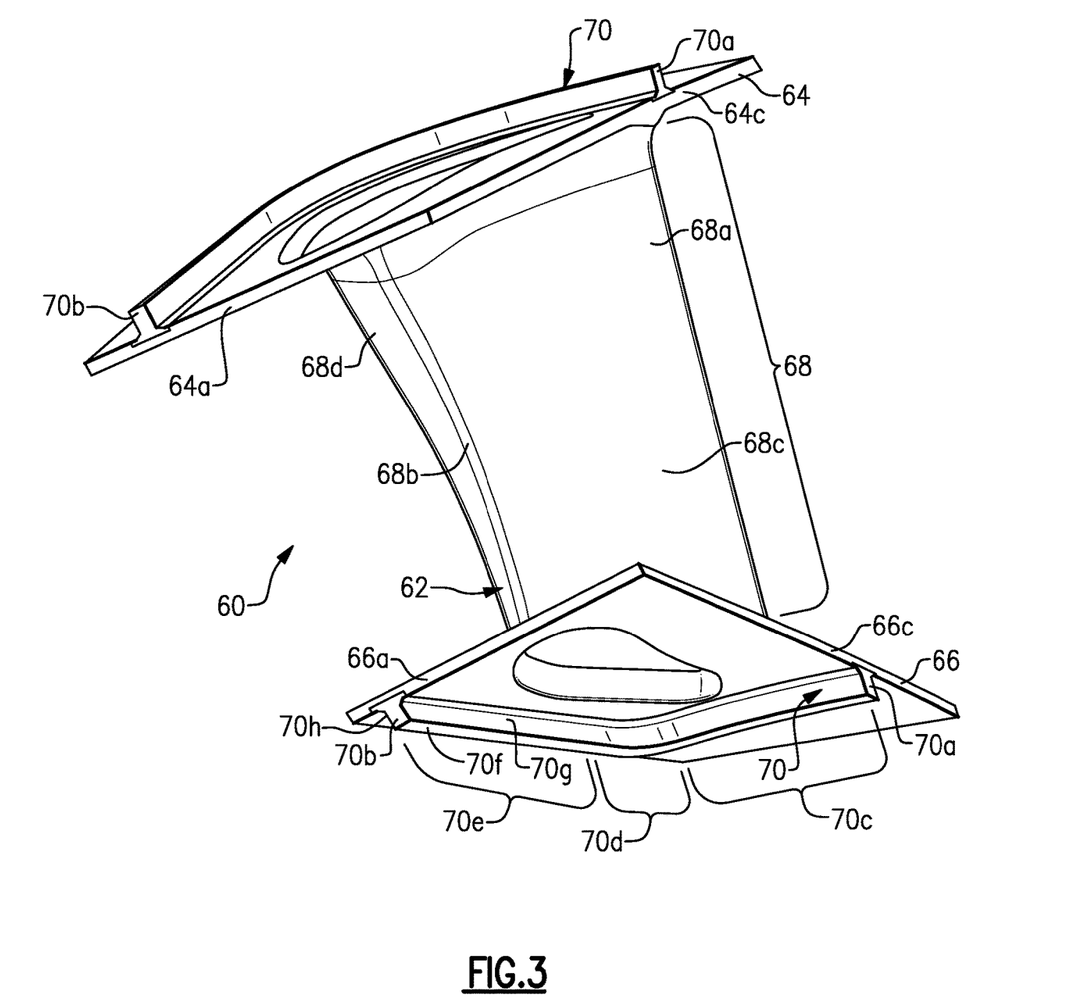
FIG. 3 illustrates another view of the vane arc segment.

FIGS. 2 and 3 illustrate different angled views of a representative vane arc segment 60 of a vane ring assembly from the turbine section 28 of the engine 20. The vane arc segments 60 are situated in a circumferential row about the engine central axis A. Although the vane arc segment 60 is shown and described with reference to application in the turbine section 28, it is to be understood that the examples herein are also applicable to structural vanes in other sections of the engine 20.

The vane arc segment 60 is comprised of an airfoil piece 62. The airfoil piece 62 includes several sections, including first and second platforms 64/66 and an airfoil section 68 that extends between the first and second platforms 64/66. The airfoil section 68 defines a leading edge 68a, a trailing edge 68b, and pressure and suction sides 68c/68d that generally circumscribe a central cavity such that the airfoil section 68 in this example is hollow.

In this example, the first platform 64 is a radially outer platform and the second platform 66 is a radially inner platform. The first platform 64 defines forward and aft (axial) sides 64a/64b, first and second circumferential mate faces 64c/64d, a gaspath side 64e, and a non-gaspath side 64f. Likewise, the second platform 66 defines forward and aft (axial) sides 66a/66b, first and second circumferential mate faces 66c/66d, a gaspath side 66e, and a non-gaspath side 66f.

The platforms 64/66 further include respective curved radial flanges 70 that project (radially) from the non-gaspath sides 64f/66f. As shown, the flanges 70 on each of the platforms 64/66 are single, exclusive flanges (i.e. there are no other flanges). The flanges 70 are continuous between their terminal ends 70a/70b and generally run from a location at or near the mate face 64c/66c, toward the other mate face 64d/66d, around the suction side 68d of the airfoil section 68, to a location at or near the forward side 64a/66a. The flanges 70 in the illustrated example are generally of constant thickness (between faces 70g and 70h).

Each of the radial flanges 70 is made up of three leg portions, designated at 70c/70d/70e. For the given orientation of the airfoil section 68, the first leg portions 70c begin at the terminal ends 70a adjacent the trailing edge 68b of the airfoil section 68 and extend toward the second mate faces 64d/66d. The second leg portions 70d extend from the first leg portions 70c and curve around the suction side 68d of the airfoil section 68. For example, the curvature of the second leg portions 70d generally follow the shape of the suction side 68d. The third leg portions 70e extend from the second leg portions 70d toward the forward sides 64a/66a. Relative to the local longitudinal direction of the flange 70 at its terminal ends, the flange 70 curves 80 degrees or more. As will be appreciated, if the airfoil section 68 were flipped in orientation such that suction side 68d was facing toward the mate faces 64c/66c and the pressure side 68c was facing toward the mate faces 64d/66d, the flanges 70 would also be flipped such that they still curve around and generally follow the suction side 68d.

In this example, the first leg portions 70c are substantially straight, the second leg portions 70d are curved, and the third leg portions 70e are substantially straight. The boundaries where the first leg portions 70c end and the second leg portions 70d begin and where the second leg portions 70d end and the third leg portions 70e begin are at inflections where the flanges 70 curve. In one further example, the first leg portions 70c are substantially parallel to the aft sides 64a/66a, and the third leg portions 70e are substantially parallel to the second circumferential sides 64d/66d. The parallel orientations facilitate segregation of loads, which may facilitate the airfoil design process. For example, because the first leg portions 70c are parallel to the aft sides 64a/66a they transmit primarily axial loads. Likewise, because the third leg portions 70e are parallel to the second circumferential sides 64d/66d they transmit primarily tangential loads. If non-parallel, the first leg portions 70c may transmit some tangential load, and the third leg portions 70e may transmit some axial load.

The flanges 70 each also define a radial face 70f, an inside face 70g (facing the airfoil section 68), and an outside face 70h (facing toward the second mate face 64d/66d). Although the radial heights of the flanges 70 could vary over their lengths, in the illustrated example the heights are substantially uniform from end 70a to end 70b and are approximately equal to the radial thickness of the platforms 64/66.

The airfoil piece 62 is continuous in that the platforms 64/66 and airfoil section 68 constitute a one-piece body. As an example, the airfoil piece 62 is formed of a ceramic material, an organic matrix composite (OMC), or a metal matrix composite (MMC). For instance, the ceramic material is a ceramic matrix composite (CMC) that is formed of ceramic fibers that are disposed in a ceramic matrix. The ceramic matrix composite may be, but is not limited to, SiC fiber in SiC matrix, carbon fiber in carbon matrix, SiC fiber in carbon matrix, carbon fiber in SiC matrix, or oxide fiber in oxide matrix. Example organic matrix composites include, but are not limited to, glass fiber, carbon fiber, and/or aramid fibers disposed in a polymer matrix, such as epoxy or polyimide. Example metal matrix composites include, but are not limited to, boron carbide fibers and/or alumina fibers disposed in a metal matrix, such as aluminum.

In a further example, the fibers are provided in fiber plies, one of which is schematically represented at 72. The plies 72 may be woven or unidirectional and may collectively include plies of different fiber weave configurations. One or more of the fiber plies 72 is continuous through the flange 70 of the first platform 64, through the airfoil section 68, and through to the flange 70 of the second platform 66. The path of the ply 72 shown may be altered to reduce fiber distortion, for example. For example, one or more of the plies 72 are bent from the respective platforms 64/66 into the radial direction to form the flanges 70. These fiber plies may be of any combination of traditional 2D woven formats such as 8HS, 5HS, twill, plain weave or biaxial or triaxial braid. Additional plies may also be provided to form other portions of the platforms 64/66, such as the portions outside of the flanges 70. Such plies may also be bent radially to meet in the flanges 70. Alternatively, the flanges could be formed completely from these platform plies. To the extent that the plies diverge from each and form a "noodle" region, the "noodle" region may be filled with additional plies or other filler. And although the flanges 70 are curved, the curvature is not so severe as to prevent manufacturability. If needed, darting or other techniques can be used to curve the fiber plies to the desired curvature while avoiding substantial wrinkling of the fiber plies.

Figure 4:
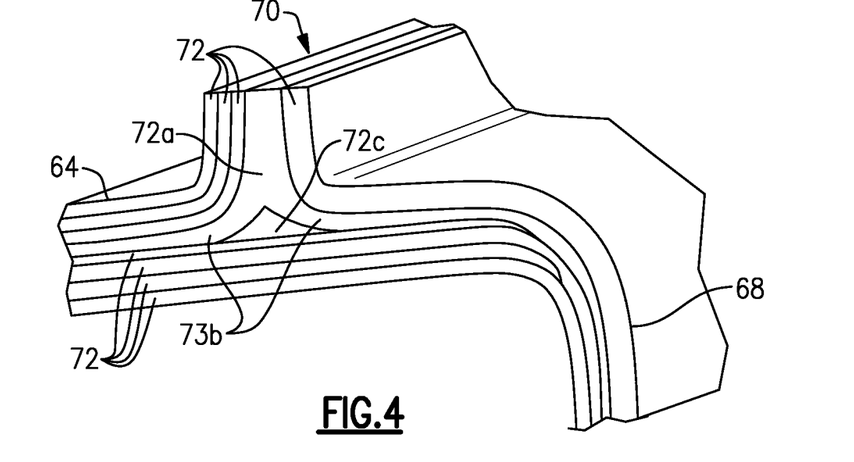
FIG. 4 illustrates an example in which fiber plies are shown in representative portions of a platform, flange, and airfoil section.

FIG. 4 illustrates an example in which the plies 72 are shown in representative portions of the platform 64, flange 70, and airfoil section 68. It is to be understood that the platform 66 and its flange 70 could be arranged in the same manner. In this example, there exists a special ply 73 which is a y-weave. A y-weave includes a consolidated section 73a and a bifurcated section 73b. In the consolidated section 73a, the plies 72 are all back-to-back in interfacial contact with each other and 73a. In the platform 64 immediately under the flange 70 the y-weave bifurcates into two legs which can be turned in opposite directions to form the platform. The consolidated section 73a forms the flange 70, while the bifurcated section 73a form the platform 64. At the location where the y-weave bifurcates from 73a to 73b there is a space 72c, which may also be referred to as a noodle region. Additional plies 72 or filler material is provided in the space 72c. Standard plies 72 would be back-to-back in interfacial contact with the regions 72c and 73b. These plies 72 do not extend into the flange 70 but do extend in the platform 64 and airfoil section 68. Alternatively, the noodle in space 72c can be incorporated into the consolidated section 73a.

Figure 5:
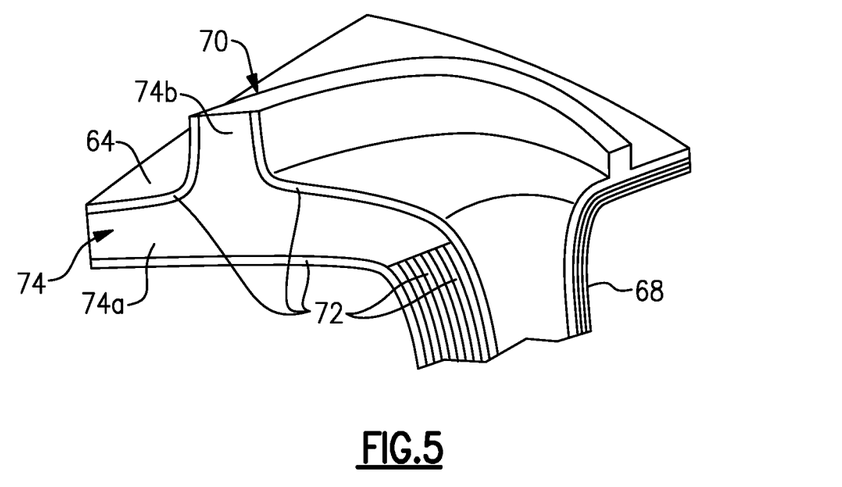
FIG. 5 illustrates another example in which there is a three-dimensional fiber body and fiber plies in a platform and flange.

FIG. 5 illustrates another example in which plies 72 are shown in representative portions of the platform 64, flange 70, and airfoil section 68. Again, it is to be understood that the platform 66 and its flange 70 are arranged in the same manner. In this example, there is a three-dimensional woven body 74 that forms the flange 72 and platform 64. The three-dimensional woven body 74 has a platform section 74a, which forms the platform 64, and a flange section 74b, which forms the flange 70. The three-dimensional woven body 74 is encased in one or more skin plies 72. One or more of the skin plies 72 extends into the platform 64 and airfoil section 68. The three-dimensional woven body 74 reduces the numbers of plies 72 that are needed to make of the thicknesses of the platform 64 and flange 70.

In general, support schemes for mounting structural vane segments formed of CMCs, OMCs, and MMCs are challenging due to lower material stress limits in comparison to high strength superalloys used for some traditional vane segments. For instance, traditional support schemes that utilize hooks or a series of rails can concentrate stresses, create aerodynamic loads, and/or create thermal stresses which may exceed material limits of fiber-reinforced composites. Therefore, even though fiber-reinforced composites may have many potential benefits, such benefits cannot be realized without a suitable support scheme. In this regard, the flanges 70 serve as single support features to facilitate a low-stress mounting scheme.

The vane arc segment 60 may be mounted in the engine 20 between inner and outer support structures. The support structures are not particularly limited and may be fixed inner and outer case structure for simply supporting the vane arc segments 60, support rings (e.g., a ring-strut-ring configuration), or the like, and are typically formed of metallic alloys that can bear the loads received.

During operation of the engine 20 combustion gases flow across the airfoil section 68 and gaspath sides 64e/66e of the platforms 64/66. The flow causes aerodynamic loads on the vane arc segment 60. The aerodynamic loads are transmitted through the vane arc segment 60 to the support structure(s). In this regard, the flanges 68 serve as primary load-bearing features to transmit such loads to the engaging support structure(s). For example, the outer faces 70h of the flanges 70 along the circumferential sides 64d/66d serve as circumferentially-facing load faces that bear circumferential loads, the outer faces 70h that face in the aft direction serve as axial (aft) load faces that bear axial loads, and the radial faces 70f of the flanges serve as radial load faces that bear radial loads. For some mounting configurations, such as ring-strut-ring, radial loads may also be transmitted through both flanges 70, while in other mounting schemes, such as strut/spar designs, only the flange 70 of the second (inner) platform 66 may transmit radial loads.

Additionally, the curved geometry of the flanges 70 facilitates avoidance of low angle corners that may otherwise concentrate stresses. Moreover, the flanges 70 also serve as stiffeners, thereby enhancing the stiffness and strength of the platforms 64/66. Such aerodynamic loads may also vary with engine cycles. The curvature of the flanges 70 facilitates distributing the varied loads. For example, the curved geometry of the flange 70 on the outer platform 64 acts as a stiffening rail. When loads are driven into the flange 70 and ultimately transmitted to the outer support structure, the stiffness facilitates distribution of the loads across the platform 64, as opposed to a "point load" scenario. Thus, the stress field may be more uniform.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
an airfoil piece defining first and second platforms and an airfoil section extending between the first and second platforms, the airfoil section having a trailing edge, a leading edge, a pressure side, and a suction side,
the first and second platforms each defining first and second circumferential mate faces, forward and aft sides, a gaspath side, a non-gaspath side, and a radial flange projecting from the non-gaspath side, the radial flange on the first platform being a sole flange on the non-gaspath side of the first platform, and the radial flange on the second platform being a sole flange on the non-gaspath side of the second platform, and
each said radial flange having a first terminal end adjacent the first circumferential mate face and a second terminal end adjacent the forward side, each said radial flange extending continuously from the first terminal end to the second terminal end and including a first leg portion extending adjacent the trailing edge, a second leg portion extending from the first leg portion and curving around the suction side, and a third leg portion extending from the second leg portion toward the forward side.

2. The vane arc segment as recited in claim 1, wherein the radial flange has a through-thickness that is uniform from the first terminal end to the second terminal end.

3. The vane arc segment as recited in claim 2, wherein the radial flange has a radial height that is uniform from the first terminal end to the second terminal end.

4. The vane arc segment as recited in claim 1, wherein the airfoil piece is hollow and is formed of a ceramic matrix composite.

5. The vane arc segment as recited in claim 4, wherein the ceramic matrix composite has a plurality of fiber plies that are continuous from the radial flange of the first platform, through the airfoil section, and through the radial flange of the second platform.

6. The vane arc segment as recited in claim 1, wherein the first leg portion is parallel to the aft side.

7. The vane arc segment as recited in claim 6, wherein the third leg portion is parallel to the second circumferential mate face.

8. The vane arc segment as recited in claim 7, wherein the third leg portion follows the curvature of the suction side.

9. The vane arc segment as recited in claim 1, wherein the first leg portion defines an aft-facing load face.

10. The vane arc segment as recited in claim 1, wherein the third leg portion defines a circumferentially-facing load face.

11. The vane arc segment as recited in claim 1, wherein the radial flange curves at least 80 degrees.

12. The vane arc segment as recited in claim 1, wherein the first leg portion of the first platform is closer to the trailing edge than to the aft side of the first platform.

13. The vane arc segment as recited in claim 1, wherein the airfoil piece includes fiber plies that form a consolidated section in the radial flange and a bifurcated section in which the plies from the radial flange split and turn away from each other.

14. The vane arc segment as recited in claim 1, wherein each of the first and second platforms includes a three-dimensional woven body encased in fiber plies that form the flanges.

15. A gas turbine engine comprising:
a compressor section;
a combustor in fluid communication with the compressor section; and
a turbine section in fluid communication with the combustor, the turbine section having vanes disposed about a central axis of the gas turbine engine, each of the vanes includes:
an airfoil piece defining first and second platforms and an airfoil section extending between the first and second platforms, the airfoil section having a trailing edge, a leading edge, a pressure side, and a suction side,
the first and second platforms each defining first and second circumferential mate faces, forward and aft sides, a gaspath side, a non-gaspath side, and a radial flange projecting from the non-gaspath side, the radial flange on the first platform being a sole flange on the non-gaspath side of the first platform, and the radial flange on the second platform being a sole flange on the non-gaspath side of the second platform, and
each said radial flange having a first terminal end adjacent the first circumferential mate face and a second terminal end adjacent the forward side, each said radial flange extending continuously from the first terminal end to the second terminal end extending continuously from the first terminal end to the second terminal end and including a first leg portion extending adjacent the trailing edge, a second leg portion extending from the first leg portion and curving around the suction side, and a third leg portion extending from the second leg portion toward the forward side.

16. The gas turbine engine as recited in claim 15, wherein the airfoil piece is hollow and formed of a ceramic matrix composite.

17. The gas turbine engine as recited in claim 16, wherein the ceramic matrix composite has a plurality of fiber plies that are continuous from the radial flange of the first platform, through the airfoil section, and through the radial flange of the second platform.

18. The gas turbine engine as recited in claim 15, wherein the first leg portion is parallel to the aft side.

19. The gas turbine engine as recited in claim 18, wherein the third leg portion is parallel to the second circumferential mate face.

20. The gas turbine engine as recited in claim 15, wherein the first leg portion defines an aft-facing load face.

\* \* \* \* \*